United States Patent [19]
King et al.

[11] Patent Number: 5,893,044
[45] Date of Patent: Apr. 6, 1999

[54] REAL TIME CLOCK APPARATUS FOR FAST ACQUISITION OR GPS SIGNALS

[75] Inventors: Thomas Michael King, Tempe; Jeffrey Jerome Ogren, Chandler, both of Ariz.

[73] Assignee: Motorola Inc., Schaumburg, Ill.

[21] Appl. No.: 786,586

[22] Filed: Jan. 21, 1997

[51] Int. Cl.[6] .................................................. G01C 21/00
[52] U.S. Cl. ........................................ 701/214; 342/357
[58] Field of Search ............................ 701/214; 342/357, 342/457

[56] References Cited

U.S. PATENT DOCUMENTS

| | | | |
|---|---|---|---|
| 5,319,374 | 6/1994 | Desai et al. | 342/387 |
| 5,373,531 | 12/1994 | Kawasaki | 375/1 |
| 5,592,173 | 1/1997 | Lau et al. | 342/357 |
| 5,594,453 | 1/1997 | Rodal et al. | 342/357 |
| 5,654,718 | 8/1997 | Beason et al. | 342/357 |
| 5,663,735 | 9/1997 | Eshenbach | 342/357 |
| 5,666,122 | 9/1997 | Carter | 342/357 |

*Primary Examiner*—Michael Zanelli
*Attorney, Agent, or Firm*—Nicholas C. Hopman

[57] ABSTRACT

An apparatus for improving the acquisition time of GPS signals includes a GPS receiver (21) and a real-time clock circuit (30). The GPS receiver receives GPS signals including a precise time reference signal for providing a position based upon the location of the GPS receiver. The GPS receiver also includes an internal time base (11) derived from the precise time reference signal. The real-time clock circuit is coupled to the GPS receiver for receiving a first time reference signal from the GPS receiver when the precise time reference signal of the GPS signal is available and for providing a second time reference signal to the GPS receiver when the precise time reference signal of the GPS signal is not available thereby allowing a fast acquisition time of GPS signals when the GPS signals are temporarily interrupted or not yet available.

13 Claims, 4 Drawing Sheets

—PRIOR ART— *FIG. 1*

| TEMP | k_osc[temp] | l_osc_unc[temp] |
|---|---|---|
| −40 | | |
| −39 | | |
| −38 | | |
| −37 | | |
| −36 | | |
| . | | |
| . | | |
| +84 | | |
| +85 | | |

| CH | SV | MET | PST | CP | CPR | PPR |
|---|---|---|---|---|---|---|
| 1 | | | | | | |
| 2 | | | | | | |
| 3 | | | | | | |
| 4 | | | | | | |
| 5 | | | | | | |
| . | | | | | | |
| . | | | | | | |
| . | | | | | | |
| N | | | | | | |

5,893,044

REAL TIME CLOCK APPARATUS FOR FAST ACQUISITION OR GPS SIGNALS

BACKGROUND OF THE INVENTION

The use of Global Positioning Satellite (GPS) receiver is widespread for determining a position fix based upon the receipt of GPS signals from GPS satellites. One of the foremost interesting specifications of a GPS receiver is the time it takes for the receiver to acquire satellite signals and deliver position coordinates to the user after power is applied to the unit. The time required to accomplish these steps is known as the time-to-first-fix (TTFF). The TTFF of any receiver is influenced by its own unique hardware and software design, and is one of the key parameters that users of GPS receiver technology scrutinize in making purchase decisions whereby the unit with the shortest TTFF has a key advantage.

In battery powered hand held GPS receivers, for example, the acquisition time influences total battery life as the unit must be powered on continuously while the user waits for position coordinates. A short period of time between power on and first fix gives the user the data he is interested in and consumes less total energy than a unit that accomplishes the same task in a longer period of time. In addition, when one is waiting for the first fix, even short periods of time can seem like an eternity.

In automotive applications, a car, having a GPS receiver installed therein, may move and change location during the TTFF period, and thus, the uncertainty in position may be particularly dangerous if the position coordinates are intended to be used in an emergency, such as a system to identify the location of an accident since the user has no knowledge of position until after the TTFF period expires.

Hence, what is needed is an invention that greatly shortens the average TTFF in order to and make the TTFF interval as short as possible and to extend battery life.

BRIEF DESCRIPTION OF THE DRAWINGS

FIG. 1 is a block diagram describing the current art GPS receiver design, specifically shows the real-time dock circuit connections to the rest of the receiver.

DETAILED DESCRIPTION OF THE DRAWINGS

Figure 5:
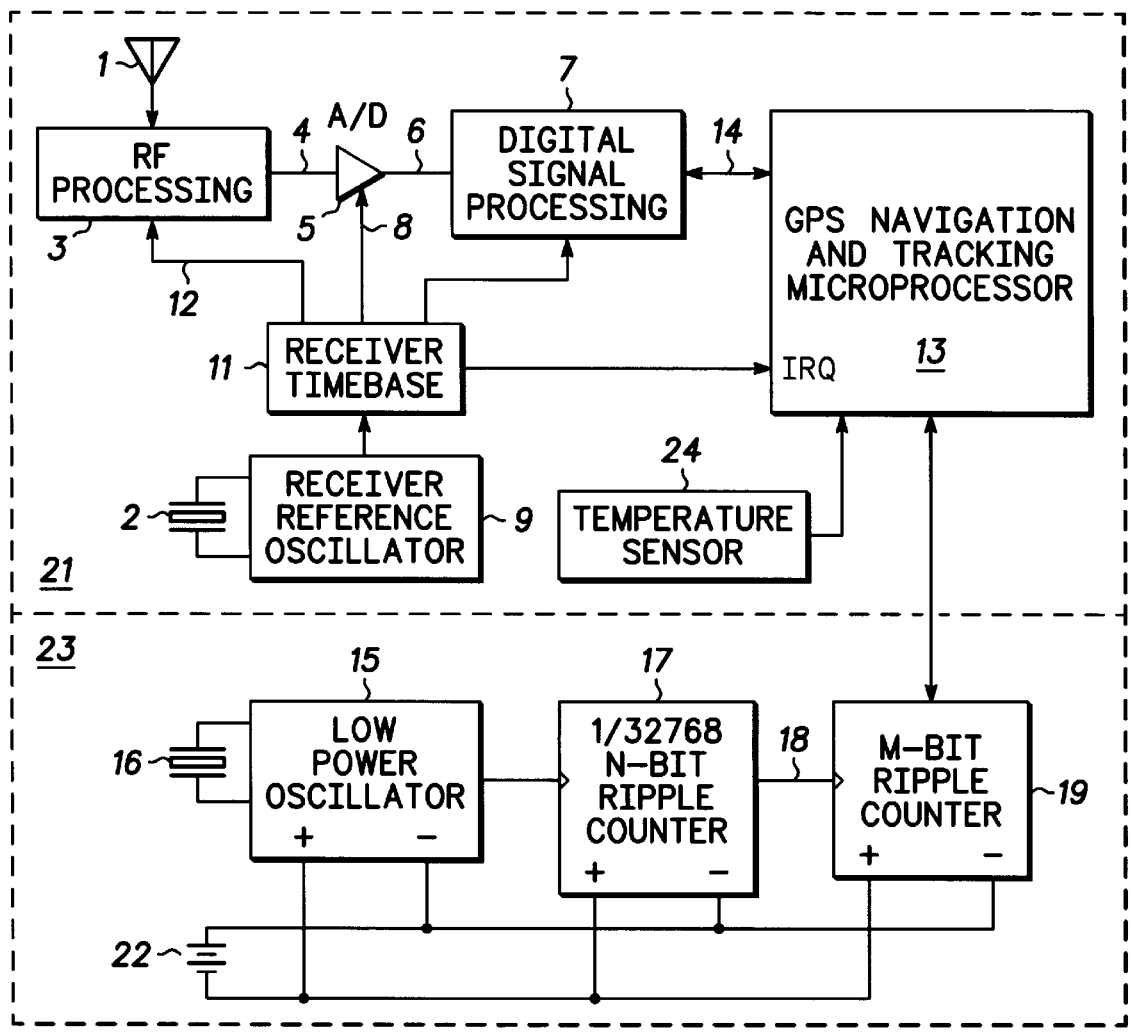
FIG. 5 is a table describing the non-volatile storage of certain GPS parameters at a rate faster than the expected rate of change of temperature.

Prior art GPS receiver typically use real-time clock circuits that have a resolution of only 1 second, and have no means of accurate synchronization to the internal GPS receiver time base. Accordingly, prior art receivers are forced to reacquire time directly from the signal measurements once power is applied to the unit. Given the 1 second time error of such a typical GPS receiver real-time clock and the fact that the time is not synchronized to the GPS receiver time base (causing perhaps an additional second of time uncertainty), such a time error would cause up to several kilometers of position error, obviously not a desirable feature and thus forcing the acquisition of time from the signal. Thus, conventional GPS receiver real-time clocks cannot be used to improve TTFF. Further, the fastest TTFF GPS receivers on the market typically achieve a first fix within 10–15 seconds after power is applied. Such a long TTFF may create substantial uncertainty in position since the user has no knowledge of position until after the TTFF period expires and may be particularly dangerous if the position coordinates are intended to be used in an emergency system, such as a system to identify the location of an accident vehicle.

However, the present invention utilizes an improved real time clock that allows that TTFF interval to be reduced to as little as 1 second under certain conditions. Using this invention, TTFF can be reduced to about one second given that the receiver had been turned on recently in the past. In addition, this invention enables much lower average power drain for applications in which a position fix is required at a relatively slow rate, say once every 30 seconds or so. By using this invention in such a power cycled system, the total power consumption is greatly reduced over the best known technology of today.

A GPS receiver typically must perform several steps to adequately and sufficiently acquire position coordinates. Referring to Table 1, several steps necessary for a GPS receiver to acquire position coordinates are listed along with their respective times to perform such steps.

TABLE 1

GPS Position Acquisition Steps

| STEP | TIME (seconds) |
|---|---|
| 1) Orbit Prediction | 1 |
| 2) Code Synchronization | 3 to 4 |
| 3) Frequency or Phase Sync | 0.5 |
| 4) Bit Synchronization | 0.2 |
| 5) Message Synchronization | 0 to 6 |
| 6) Ephemeris Collection | 18 to 30 |
| 7) PVT Computation | 0.5 |
| TOTAL (without stored ephemeris) | 23 . . . 43 |
| TOTAL (with stored ephemeris) | 5 . . . 13 |

As can be seen from Table 1, the total time to perform these steps is 23 to 43 seconds (without stored ephemeris) and 5 to 13 seconds (with stored ephemeris). A brief description of each step will now follow.

The step of Orbit Prediction uses the last known position coordinates, satellite almanac orbit parameters, and current time from a receiver resident real-time clock to compute satellite visibility and estimated satellite Doppler and estimated frequency of the receiver reference oscillator.

The step of Code Synchronization is the process of aligning the replica PN code sequence with that received from the satellite. Most modern GPS receivers use an algorithm known as sequential detection for this process by which the replica PN code is adjusted in phase until correlation is achieved. Since the receiver reference clock phase is not known relative to the satellites, the entire code phase space must be searched at power-on (1023 total chips).

The step of Frequency or Phase Synchronization is the process by which the estimated Doppler generated in the receiver is aligned with the actual Doppler of the received signal (from here on, the term "Doppler" refers to the Doppler shift of the transmitted signal due to satellite motion and the Doppler shift induced on the received signal due to an offset in frequency of the receiver reference oscillator). This is typically accomplished via a narrow bandwidth automatic frequency control loop or a phase locked costas loop and cannot begin until after Code Synchronization is obtained.

The step of Bit Synchronization is the process by which the receiver aligns its processing to the 50 bits per second (BPS) data stream transmitted by each satellite. This step cannot begin until the frequency or phase of the replica Doppler signal is close to the actual Doppler or phase of the received signal.

The step of Message Synchronization is the process by which the receiver aligns its processing to the 50 BPS data stream as transmitted by each satellite. The message is structured into 300 bit long subframes, and synchronization can only be obtained at the start of each subframe (hence, up to 6 seconds is required at the 50 BPS data rate). It is also noted that the step of Message Synchronization also provides the precise time of arrival measurement of the satellite signal.

The step of Ephemeris Collection is the process by which the receiver obtains the precise satellite orbit parameters from each satellite by decoding the broadcast 50 BPS data message. The ephemeris data provides the means by which the receiver computes the true position of each satellite as a function of time. Depending on where message synchronization is achieved relative to the 300 BPS message length, the process of ephemeris collection can take between 18 and 30 total seconds.

The step of the PVT Computation process is that required by the receiver to compute user position and precise time from the range measurements, and precise time estimate.

One popular technique of speeding up TTFF is to use what is called a "hot start" mode by which the receiver keeps the current satellite ephemeris data resident in non-volatile memory during the off period, thus avoiding the ephemeris collection process if the off period is short compared to the age of the ephemeris data currently being broadcast by each satellite. Using this technique, however, only avoids step 6 (of Table 1) and typical "hot start" TTFF acquisition times are still in the 10 second range.

Referring to FIG. 1, a block diagram illustrating the hardware components of a typical GPS receiver is shown. The GPS receiver includes a switched power section 21 and a battery powered section 23. The battery powered section 23 includes a low power oscillator circuit 15 that runs at a relatively low frequency, a divider circuit 17 for generating 1 second time ticks via signal line 18, and a real-time clock circuit 19 that keeps track of time from some initialized state in some convenient time format such as hours, minutes, seconds, months, days, years. The battery powered section 23 consumes very little power compared to the switched power section 21, and thus can be powered from a small battery 22 for a long period of time.

The switched power section 21 includes an antenna 1 for receiving GPS satellite signals at a predetermined carrier frequency, for example, 1575.42 Mhz whereby the received GPS signal includes a precise time reference signal that a GPS receiver uses for measuring time. Switched power section 21 also includes an RF Processing block 3 for down-converting the spectrum of the desired signals to an intermediate frequency IF signal, via signal line 4, an Analog to Digital converter 5 for converting the IF signal 4 to a digital replica, via signal line 6, of the IF signal at some convenient sample rate Fs as supplied via signal line 8. The switched power section 21 also includes digital signal processing block 7 for performing the high speed signal processing functions on the digital IF signal 6, such as synchronization and despreading of the CDMA signals, wiping off the continuous wave IF signal, estimation and wipe off of the signal Doppler or carrier phase, and generation of the code phase and code phase rate measurements at some convenient sample rate such as once per second. These measurements are either generated by or delivered to a GPS navigation and tracking microprocessor 13 at the desired measurement epoch time such as once per second via an interface bus 14. The measurement epoch is the point in time at which the receiver measures the satellite pseudorange and the position coordinates that are eventually computed correspond to the position of the antenna at that time. In typical GPS receivers, the measurement epoch data at one second measurements are actually computed in the microprocessor 13 by counting 1000 1 KHz epochs and computing the code phase and code phase rates coincident with every 1000th interrupt. In this configuration, the microprocessor 13 may also control the acquisition and tracking function in software using digital signal processing techniques.

Timing of events within the receiver are controlled by a time base circuit 11 whose function is to coherently generate all of the necessary timing, clock, and reference signals used internal to the GPS receiver from a single reference oscillator 9. This oscillator is free-running and not synchronized to the satellites, thus the receiver must eventually compute the offset of the time base 11 relative to the satellite time base. The precise time reference signal decoded from the satellites is used by the receiver to infer the time in the internal time base 11 after position data is acquired from the GPS constellation. After acquisition of the position data, precise time (and therefore the time bias of receiver time base 11) is computed as a direct result of the navigation solution computed in microprocessor 13.

When a GPS receiver has available valid pseudorange measurements to three or more satellites, it is capable of computing position to an accuracy of 100 meters, 2 D RMS (within 100 meters, 95% of the time). One of the direct results of the navigation solution is the computation of the measurement epoch time to a high degree of accuracy on the order of tens of nanoseconds. Recall that the measurement epoch time is the time at which the receiver makes the common pseudorange measurements to all of the satellites. The absolute time of the measurement epochs (i.e., every 1000'th interrupt) become precisely known to an accuracy in the range of tens of nanoseconds when user position is computed.

The fundamental limitation of existing GPS receiver designs towards reduction of TTFF is thus limited by the fact that it is not possible to predict accurate time to high enough precision in order to avoid the process of the collection of accurate time from the broadcast satellite data, nor to be able to predict the code phase to high enough precision to greatly reduce the total code phase search space.

Figure 2:
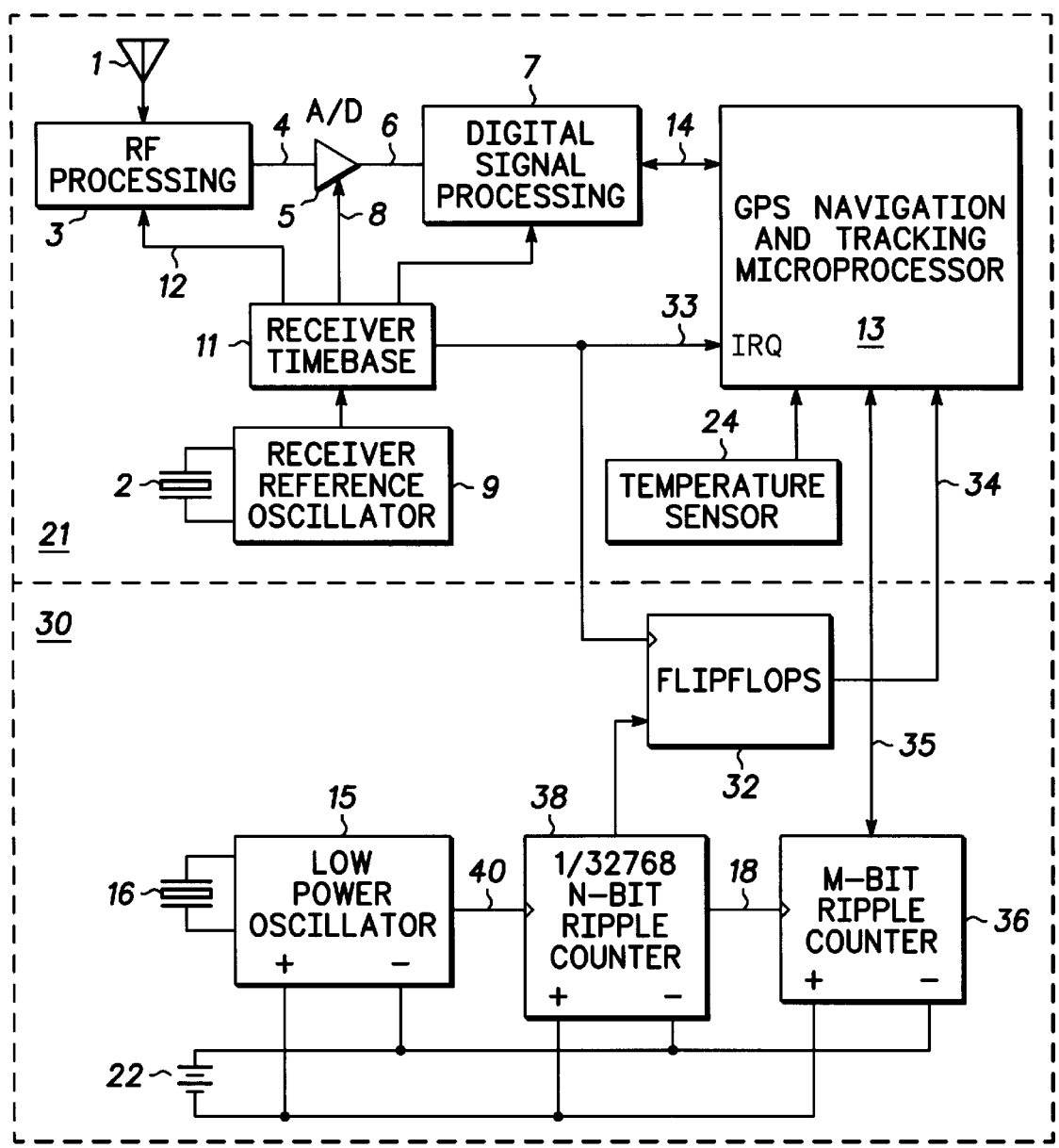
FIG. 2 is a block diagram showing the improved real-time clock circuit and its required connections to the rest of the receiver.

Referring to FIG. 2, a block diagram illustrating the hardware components of a GPS receiver in accordance with the present invention is shown. It is understood that components shown in FIG. 2 that are identical to components shown in FIG. 1 are identified by like reference numbers. FIG. 2 illustrates the improved real-time clock circuit 30 and the flip flops 32 necessary to synchronize the GPS receiver time base 11 with the real-time clock circuit, 30. The improved real-time dock circuit 30 includes the same low power oscillator 15 as in FIG. 1, typically running at 32.768 KHz, an n-bit ripple counter circuit 38 for dividing the low power oscillator frequency signal 40 down to a 1 Hz signal 18, and another m-bit ripple counter for dividing the 1 Hz signal 18 down so that there is an unambiguous time reference of more than two years. In the preferred embodiment, n is 15 bits and m is at least 26 bits.

The n output bits from the n-bit ripple counter 38 are captured every millisecond by interface flip flops 32. The clock signal 33 for the flip flop interface 32 is generated by the receiver time base circuit 11, so as to capture the count (i.e., time) in the improved real-time clock 30 at each 1 KHz edge. Since one of these 1 KHz edges also represents the receiver measurement epoch, it is possible, via the appropriate software running in microprocessor 13, to obtain time from the RTC by reading the contents of the n-bit interface register 32 and the m-bit counter 36 in the 1 KHz interrupt interval that corresponds to the measurement epoch. In the embodiment shown in FIG. 2, time is available to a resolution of about 1/32 of 1 millisecond. On the contrary, in typical prior art receivers, time is available only to a resolution of 1 second and is not synchronized to the receiver time base.

The present invention allows accurate GPS time to be transferred from the receiver 21 to the improved real-time clock 30 during periods when the receiver is tracking satellites and position and time coordinates are readily available to the user. This is accomplished by storing in non-volatile memory the precise GPS time and the total N and M bit count read from the real-time clock circuit as read by microprocessor 13 at each measurement epoch. This allows a time reference signal to be transferred from GPS receiver 21 to RTC 30 when the receiver is tracking satellites and position and time coordinates are readily available. When power is then turned off, the improved real-time clock 30 maintains this accurate time to an accuracy level limited by the stability of the low power oscillator 15, and the last known values of precise GPS time and its corresponding RTC counter value is kept in non-volatile memory until the next power-on cycle. When power is reapplied, the n-bit ripple counter 38, in conjunction with the interface circuit 32, allow this accurate time to be transferred back into the microprocessor 13 and subsequently into the time base 11 adding the change in time recorded by the RTC circuit to the last known value of precise GPS time stored in non-volatile memory. This allows a time reference signal to be transferred from RTC 30 to GPS receiver 21 immediately upon reapplying power thereby providing a time reference signal when the GPS precise time reference signal is not available. Once an estimate of accurate time is established in the receiver, this time can be used with little effects on position error until the receiver can re-collect precise GPS time from the satellite measurements again. In this way, the absolute time as well as the unknown clock bias in the GPS receiver time base can become an accurately estimated parameter upon turn-on, and avoids the need of obtaining accurate time from the satellite broadcast data before position computation can begin, thus shortening TTFF.

This improved real-time clock can be used to greatly reduce the acquisition time because it allows accurate time to be maintained during power-off periods or when GPS signal are unavailable, which then directly allows the acquisition of the spread spectrum signal, via a constrained code phase search algorithm, where the code phase is constrained to be only over the code phase ranges at which the code phase is likely to be (based on current precise time, known location of the satellite, and estimated uncertainty in position since the unit has been switched off). This substantially reduces the search process to a small fraction of the total code phase search space. It also allows for the elimination of the bit sync and message sync processes as well as the data decode steps required to obtain current time from the satellite. By using this technique, the receiver is capable of TTFF's on the order of 1 second after short term power outages.

Referring to Table 2, the position acquisition steps, and their corresponding times to implement such steps, is shown.

TABLE 2

GPS Position Acquisition Steps using the Improved Real Time Clock.

| STEP | TIME (seconds) |
|------|----------------|
| 1) Orbit Prediction | ZERO |
| 2) Code Synchronization | 0.3 |
| 3) Frequency or Phase Sync | 0.5 |
| 4) Bit Synchronization | ZERO |
| 5) Message Synchronization | ZERO |
| 6) Ephemeris Collection | ZERO |
| 7) PVT Computation | 0.5 |
| TOTAL | 1.3 seconds |

As can be seen from Table 2, the total time to perform these steps has been significantly reduced from is 5 to 13 seconds (from Table 1) to only 1.3 seconds (with stored ephemeris). This is accomplished because several steps are eliminated and other are decreased in time. For example, the step of Orbit Prediction is eliminated because it is assumed that the receiver was recently used and therefore the constellation has probably not moved much to influence the satellite selection. The time since last used can be measured by the real-time clock, and used to judge the sameness of visibility. The Doppler is predicted from previously measured Doppler, current time, and satellite broadcast almanac data previously stored in non-volatile memory. One skilled in the art will also recognize that this is not the only way to quickly predict satellite visibility and Doppler at turn-on. For example, another way to greatly reduce the computational load of predicting satellite visibility at turn-on would be to compute a simple 2nd order curve fit for the satellite position coordinates over a several hour period (from current time to time in the future) while the receiver is operational, then at the next power-on, use the curve fit coefficients to predict Doppler and Range quickly, without having to evaluate the almanac data for every satellite at the current time and estimated user position. Also noted again is that the Estimated Doppler includes the Doppler shift of the signal due to satellite motion and the contribution due to the receiver reference oscillator frequency. Every GPS receiver measures and calibrates the receiver reference oscillator frequency so that at turn-on, the uncertainty in the reference oscillator frequency is constrained.

The step of Code Synchronization is greatly decreased since the current code phase relative to the receiver time base can be estimated using the last measured code phase, last measured code phase rate, the time of these measurements, as well as current time as indicated by the improved real-time clock. Parameters are stored in non-volatile memory during the power-off event.

The step of Frequency or Phase Synchronization takes the same amount of time as before as it includes the lockup time of a frequency locked or phase locked loop using a narrow band process which can take the reciprocal of the bandwidth time to complete. The 0.5 second entry in the table assumes a 2 Hz bandwidth tracking loop.

The step of Bit & Message Synchronization is eliminated under most conditions as the time of the bit transition can be predicted from previous bit sync status data. Note that the data bits, bit sync, and code phase are all synchronous, thus knowing code phase, bit sync, and message sync locations before the power off interval and being able to accurately predict code phase after the power-off interval also predicts the bit sync and message sync status after the power off interval, thus eliminating the need to search. That is, if the code phase can be estimated, then the data bit transition location can also be predicted and there is then no need to search for bit sync.

The PVT Computation process is that required by the receiver to compute user position and precise time from the range measurements and satellite ephemerides.

The improved real-time clock circuit also provides a means of calibrating the low power oscillator 15 with the very accurate GPS time measurements made by the receiver 21. Using the improved real-time clock, the microprocessor 13 can calibrate the low power oscillator 15 when the receiver is tracking satellites by computing a calibration constant (k_osc) that is a function of the ratio:

$$k\_osc=(\Delta RTC)/(\Delta GPS); \quad [1]$$

where:

ΔRTC is the difference of two real-time clock time measurements taken at two different GPS measurement epoch periods; and ΔGPS is the difference of two subsequent GPS accurate time readings that correspond to GPS measurement epochs.

Those skilled in the art will recognize that the calibration constant k_osc may be improved by averaging or filtering many subsequent ratios of ΔRTC/ΔGPS, the key being that the calibration coefficient can then be used to improve the time difference measurement created by the real-time clock circuit. Also, one skilled in the art will also realize that the calibration coefficient of the low power oscillator can be modeled and calibrated over temperature variations using a receiver resident temperature sensor 23 that is readable by microprocessor 13. Through these two techniques, the ability of the improved real-time clock circuit to maintain and predict accurate time is enhanced, and the uncertainty in the absolute time is greatly reduced as the system is used over time, temperature, and various periods of off-time.

The data processing necessary to use the improved real-time clock circuit for the purpose of greatly decreasing TTFF is now discussed and may be separated into two processes: (1) a real-time data collection process by which the appropriate measurements are made and stored in non-volatile memory while the GPS receiver is operational, and (2) a power-up processing sequence that runs immediately at power-on in order to achieve first fix in as short a time as possible.

REAL-TIME DATA COLLECTION PROCESS DESCRIPTION

Figures 3, 4:
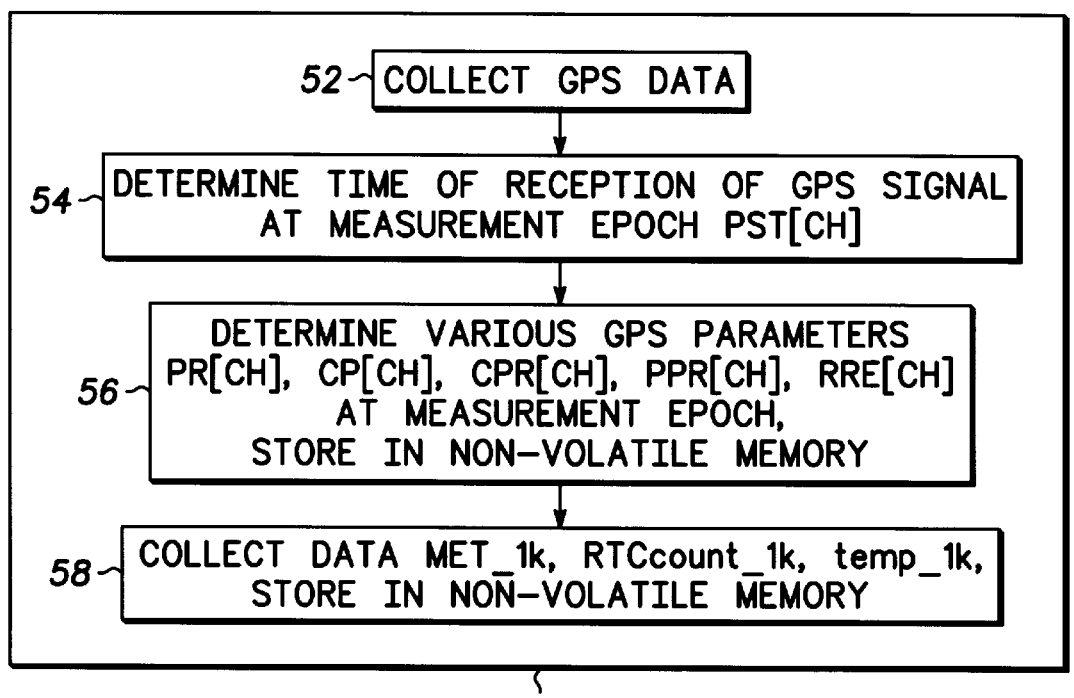
FIG. 3 is a detailed flow chart illustrating the real time data collection process.
FIG. 4 is a table describing the non-volatile storage of certain GPS parameters each second coincident with the measurement epoch.

Referring to FIG. 3, a detailed flow chart 50 illustrating the real-time data collection process is shown. When the receiver is tracking satellites and providing position coordinates to the user, various data is collected from each satellite being tracked, as represented by box 52. The data collected is coincident with the 1 second measurement epoch and includes the following data where the [ch] index refers to a particular channel number of the receiver.

1) SV[ch], the satellite ID code of the satellite being tracked on channel [ch].
2) MET[ch], the precise GPS measurement epoch time for which measurements were made on this channel [ch], as predicted by the position-velocity-time software.
3) PST[ch], is the time of reception of the signal at the measurement epoch, in GPS time of the week coordinates (0 through 604799.9999999 seconds since UTC midnight the proceeding Saturday/Sunday transition). PST can be written as:

$$PST=K*ZCOUNT+NBITS*0.020+FBITS*0.001+CP*0.001; \quad [2]$$

where,

ZCOUNT—The ZCOUNT from the last observed subframe 2 (in the 50 BPS data message);

K—is a scale factor to convert ZCOUNT to seconds time (6)

NBITS—is the total number whole data bits collected since ZCOUNT was last observed;

FBITS—is the fraction of 1 bit that has partially been collected in units of 1/20 of 1 bit.

CD—is the fraction of 1 PN code phase length of the measured PN code phase at the measurement epoch (value between 0 . . . 1);

Equation [2] can be simplified as:

$$PST[ch]=T\_ms[ch]+CP[ch]*0.001; \quad [3]$$

where,

T_ms[ch] is in units of whole integer milliseconds, and the fractional part of time below 1 millisecond is represented by the properly scaled PN code phase component CP[ch].

After PST[ch] is measured by the receiver, as represented by box 54, it can then be used to generate various GPS parameters that are used in the navigation equations for the computation of position, as represented by box 56. For example, pseudorange (pr) is computed from the equation:

$$pr[ch]=SOL*(MET[ch]-PST[ch]); \quad [4]$$

where

SOL is the GPS constant for the speed of light.

Other parameters stored by the GPS receiver at the measurement epoch include the following data, the method of computation and storage being well known by one skilled in the art.

3) CP[ch], the instantaneous code phase of the satellite on this channel, in fractions of one PN code phase length. (0 . . . 1)
4) CPR[ch], the observed code phase rate (i.e., satellite Doppler plus receiver reference oscillator offset frequency) on this channel,
5) PPR[ch], the predicted range to the satellite as predicted by the receiver by use of the ephemeris data, the current channel time, and the last known location of the receiver. Note that the receiver then computes the residual range error (rre[ch]) for eventual computation of a position correction using the equation:

$$rre[ch]=PPR[ch]-pr[ch];$$

This collected data is placed in a block of non-volatile memory 60, such as one shown in FIG. 4 whereby FIG. 4 is a pictorial diagram illustrating a block of memory storing data collected from each channel by the GPS receiver at the one second measurement update rate. Such stored data will be retained by the receiver during power-off periods, and represents the data last observed by the receiver.

In addition to the data shown in FIG. 4, the following data is also collected on the measurement epoch at some convenient rate, not necessarily each second, but at a rate that is faster than the expected rate of change of temperature of the unit by microprocessor 13, as represented by box 58.

1) MET_lk, which is the last known precise GPS measurement epoch time for which measurements were made as predicted by the position-velocity-time software coincident with the last measurement epoch.
2) RTCcount_lk, which is the contents of the n bit and m bit ripple counters coincident with the last known measurement epoch. RTCcount_lk can be considered a floating point number with the m bits representing integer seconds and the n bits representing fractional seconds.
3) temp_lk, which is the last known temperature from the temperature sensor.

This data may then be used to build entries into a set of arrays in memory, as shown in FIG. 5 whereby FIG. 5 is a pictorial diagram illustrating memory 70 for storing real-time dock oscillator calibration data as a function of temperature. The software running in the microprocessor 13 computes and updates a calibration constant (k_osc[temp]) as shown in equation 1 and the uncertainty in the calibration constant (k_osc_unc[temp]) as a function of temperature. The software updates the entries stored in memory 70, where each entry in the memory represents the calibration constant of the RTC oscillator at a particular temperature and its associated uncertainty. As new RTC oscillator calibration data at various temperatures becomes available, each entry in memory 70 becomes the result of many filtered measurements at or approximately at the temperature in question.

Those skilled in the art will recognize that the data stored in memory 70 can subsequently be used to calibrate the low performance RTC oscillator and improve its ability to keep track of changes in time as a function of temperature and temperature change. It is also recognized that an array of data is not the only way in which this data can be stored, for example, the data could also be computed and stored that correspond to coefficients of a 3rd or higher order curve fit where the independent variable is temperature. Note that this would accomplish the same goal of improving the time keeping ability of the RTC oscillator as calibrated by the precise time available from the GPS satellites while the receiver is operational. It is also recognized that the data need not be stored at every integer temperature reading, but could be stored at reduced granularity given some assumption about how rapidly the calibration coefficient changes as a function of temperature, and then interpolate at temperatures between points previously measured.

POWER-ON PROCESSING SEQUENCE DESCRIPTION

Figure 6:
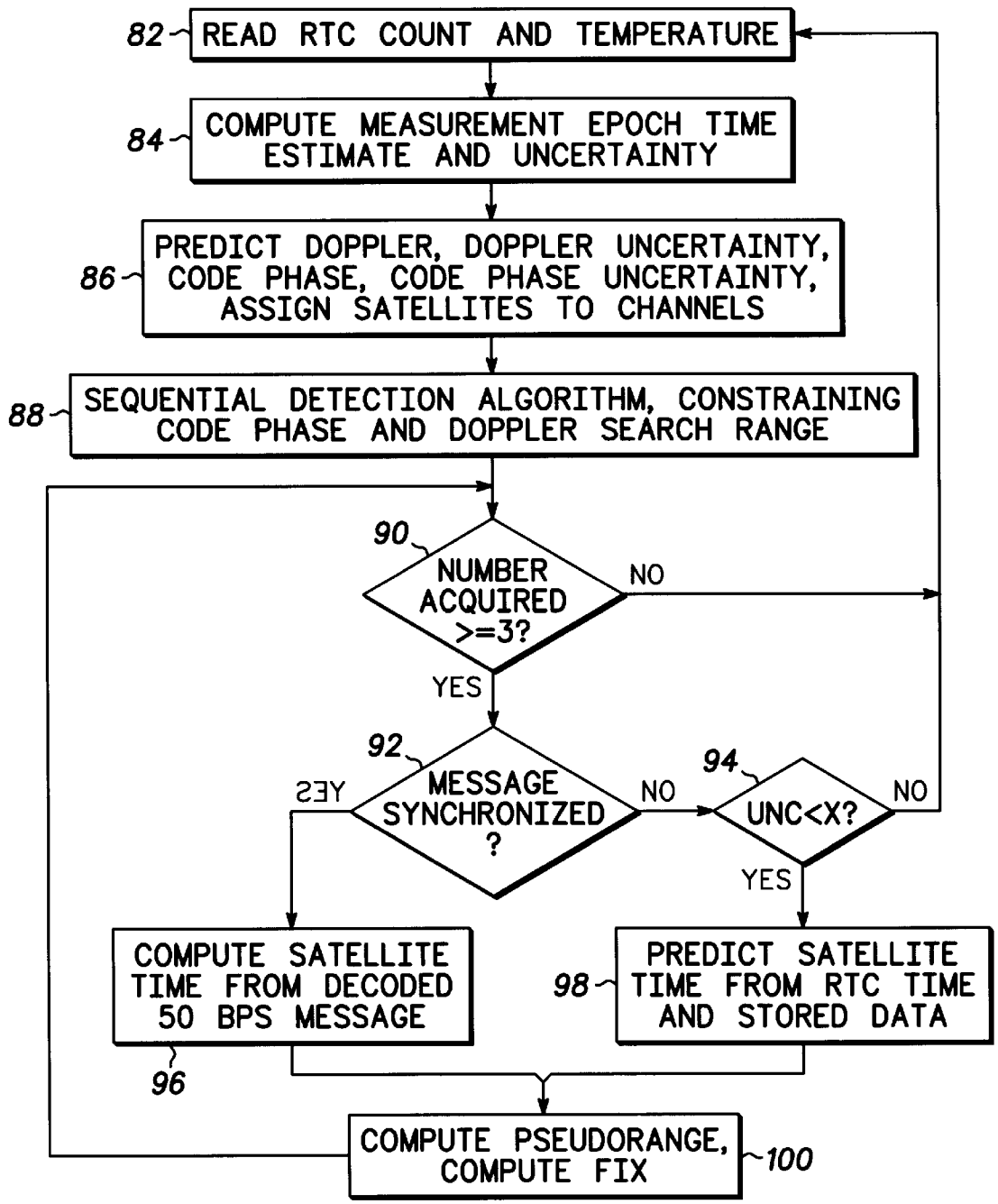
FIG. 6 is a detailed flow chart illustrating the power-on sequence in order to achieve TTFF in about 1 second.

Referring now to FIG. 6, a flow chart illustrating the steps performed when, after a short interruption in GPS coverage, power is applied to the GPS receiver to obtain the first position fix. These steps, of course, assume that data is already stored in memories 60 and 70.

BLOCK 82—The first step is to read the contents of the Real-Time Clock Counter 36 and 38 coincident with a convenient first measurement epoch after power-up. Let the count be represented as RTCcount_new. In addition, temperature is read from the temperature sensor, temp.

BLOCK 84—Compute MET_est, the estimated time of a measurement epoch, and MET_unc, the time uncertainty in the measurement epoch time estimate at turn-on using data stored in memory blocks 60 and 70 as follows:

Compute dt, the elapse time between the last measured measurement epoch time stored in memory 60, and a convenient 1 KHz epoch as captured by Receiver Time Base 11 and FlipFlops 32. Calibrate the time difference using the data stored in memory 70.

average_temp=(temp+temp_lk)/2;
dt=k_osc[average_temp]*(RTCcount_new−RTCcount_lk);
MET_est=MET_lk+dt;
MET_unc=a function of (dt, temp, temp_lk, k_osc_unc[.]);

BLOCK 86—Predict satellite Doppler, Doppler_uncertainty, Code Phase, Code Phase Uncertainty, and assign satellites to channels. The satellite assignment to channels can be as simple as assigning to channels those satellites that were previously tracked as shown in memory 60, or predicted and computed via some other algorithmic means. This includes the steps of:

Compute the code phase estimate and code phase uncertainties relative to the new measurement epoch after power-on from measurements recorded in memory 60 and 70 relative to the previous measurement epoch, as well as dt computed in step 1. One example computation for short term dt is as follows:

CP_est[ch]=modulo(CP[ch]+dt*CPR[ch],CPL);

where CPL is a constant representing the total code phase length, and modulo is the well known function of constraining the sum between zero and +CPL.

CP_unc[ch]=a_function_of(k_osc_unc[average_temp], dt);

Note that the code phase uncertainty is a function of dt as well, and generally is computed by an assumption about how far and how fast the receiver may have moved in the dt time interval, as well as a contribution due to changes in the receiver local oscillator frequency during the power off period due to temperature variation. Once the CP_unc grows to one code phase length, then the benefit of constraining the code phase search is lost, however there is still a realizable reduction in TTFF to be achieved from being able begin the position fix computations ahead of the collection of the precise satellite time as decoded from the satellite broadcast data message.

Dopp_est[ch]=CPR[ch];
Dopp_unc[ch]=a_function_of(k_osc_unc[average_emp], dt);

Dopp_est and Dopp_unc are used as shown above until the normal satellite visibility computation and Doppler estimation process completes in a few seconds after power up. Then, the parameter Dopp_est[ch] is replaced by that computed from the normal satellite visibility computation if the channel has failed to acquire.

BLOCK 88—The channels search for the satellite signals using a sequential detection algorithm while constraining the code phase and Doppler search ranges to the regions:

CP_est−CP_unc<=Code Phase<=CP_est+CP_unc;
Dopp_est−Dopp_unc<=Doppler<=Dopp_est+Dopp_unc;

where the CP_unc and Dopp_unc are a small fraction of the total possible search ranges, thus the receiver acquires the signal is shorter period of time.

Blocks 82, 84, and 86 must be updated at a rate that guarantees that the code phase is constrained to overlap the true code phase as it moves due to the effects of Doppler shift and receiver oscillator drift, such as once every 100 milliseconds.

BLOCK 90—Until three satellites are acquired to code and frequency lock, there is no need to proceed. The process of keeping the code phase and Doppler estimates constrained continues.

BLOCK 92—Before the receiver acquires message sync (and thus, a measure of precise satellite time from the 50 BPS satellite broadcast message), the receiver follows the right-hand path in order to predict precise satellite time by use of accurate current time measurements and data previously stored in non-volatile memories 60 and 70.

BLOCK 94—When the estimated time uncertainty grows to a certain threshold X, which will cause a particularly large value of position error (user specified), then the receiver waits until message sync is obtained before a position fix is computed. Until the time uncertainty grows to X, then the receiver predicts precise satellite time by use of time measurements from the RTC 30 and data previously stored in non-volatile memories 60 and 70.

BLOCK 98—The receiver is able to compute a value of predicted satellite time (PST_predict) when the above three logic paths direct the receiver processing to this point. The algorithm to accomplish this is to compute the closest integer millisecond (T_ms) from equation [3] that minimizes the total error as follows:

$$PST\_predict[ch]=PST[ch]+CPR[ch]*dt; \quad [5]$$

note also that PST_predict[ch] must also be equal to $$PST\_predict[ch]=T\_ms+0.001*CP\_current[ch]; \quad [6]$$

where CP_current is the code phase at a measurement epoch after the power cycle event.

Substituting [5] into [6] and solving for T_ms to the closest 1 millisecond value gives:

$$T\_ms[ch]=closest\_1ms\_value\_of(PST[ch]+CPR[ch]*dt-CP\_current[ch]); \quad [7]$$

and then the current value of PST_current to be used in the navigation equations for use in computing pseudorange is as follows:

$$PST\_current[ch]=T\_ms[ch]+0.001*CP\_current[ch]; \quad [7]$$

Thus, this process has predicted the value of T_ms[ch] at the power-on time to the closest 1 millisecond integer, and then added the current code phase to produce a precise satellite time (and hence, its pseudorange) before the receiver decodes the satellite broadcast data message. Accordingly, this allows for a substantial reduction in TTFF as previously shown and described with reference to Table 2.

BLOCK 100—Compute pseudorange and the navigation solution using traditional techniques.

Thus, in summary, the process predicts the code phase at turn-on from previously stored data and the precise time indicated by the deeply integrated real-time clock, greatly reducing the code phase and Doppler search space and therefore the time to acquire the signal. After acquisition of code and frequency lock, the system software computes a usable value of precise satellite time (PST) in order to be able to immediately compute pseudorange (and therefore, a position solution) before the 50 BPS data message is decoded (i.e., acquisition of bit sync and observation of the Z-count at the start of each 6 second subframe) to indicate time. When the normal 50 BPS data message is acquired, then normal data processing prevails and the substitution of step 5 is no longer needed.

What we claim is:

1. An apparatus for improving the acquisition time of global positioning satellite (GPS) signals, comprising:

a GPS receiver having a microprocessor for receiving GPS signals for providing a position based upon the location of said GPS receiver, said GPS signals including a precise time reference signal and said GPS receiver including an internal time base derived from said precise time reference signal;

a real-time clock circuit coupled to said GPS receiver for receiving a first time reference signal from said GPS receiver when said precise time reference signal of said GPS signal is available and for providing a second time reference signal to said GPS receiver when said precise time reference signal of said GPS signal is not available; and wherein, said GPS receiver greatly reduces a GPS signal acquisition time by using said second time reference signal to conduct a constrained code phase search thereby substantially reducing said constrained code phase search for a fraction of a total code phase search space.

2. The apparatus of 1 wherein said real-time clock circuit includes:

a free-running low power oscillator for generating periodic clock pulses at a predetermined rate;

an N bit counter circuit, responsive to said low power oscillator circuit, for generating a pulse per second signal;

an M bit counter circuit, responsive to said pulse per second signal, for generating an unambiguous time count.

3. The apparatus of claim 2 wherein said second precise time reference signal includes said N bit counter value and M bit counter value;

wherein said microprocessor circuit is to read said N bit counter value and said M bit counter value.

4. The apparatus of 3 wherein said internal time base of said GPS receiver is derived from a reference oscillator for generating periodic 1 KHz pulses and wherein said periodic 1 KHz pulses are used to capture the count of said N bit counter circuit at the precise time of each of said periodic 1 KHz pulse and wherein said microprocessor interprets said N bit counter value and M bit counter value as said second time reference signal whose resolution is substantially less than 1 millisecond.

5. The apparatus of 1 wherein said GPS receiver includes non-volatile memory such that loss of data is prevented when power to said GPS receiver is removed.

6. A method for improving the acquisition time of global positioning satellite (GPS) signals for a GPS receiver, the method comprising the steps of:

receiving GPS signals having a precise time reference signal associated therewith;

using said precise time reference signal to calibrate a real-time clock circuit;

providing a first time reference signal to said real-time clock circuit;

supplying a second time reference signal to said GPS receiver when said precise time reference signal of said GPS signal is not available; and conducting a constrained phase search using said second time reference signal thereby substantially reducing said constrained code phase search to a function of a total code phase search space.

7. The method of claim 6 further including the step of using said second time reference signal to determine a predicted timing reference for use by said GPS receiver before said precise time reference signal associated with said GPS signal is available.

8. The method of claim 6 further including the step of using said predicted timing reference to predict satellite pseudorandom noise code phase and satellite Doppler.

9. The method of claim 8 further including the step of using said predicted satellite pseudorandom noise code phase and said satellite Doppler to constrain a sequential detection algorithm thereby requiring less time to acquire said GPS signals.

10. The method of claim 6 further including the steps of performing real-time data collection including the substeps of:

tracking GPS satellites while power is applied to said GPS receiver;

capturing GPS parameter data each second coincident with GPS measurement epoch time wherein said GPS measurement epoch time is substantially equal to said precise time reference signal; and storing said GPS parameter data each second in memory.

11. The method of claim 10 further including performing a power-on sequence including the substeps of;

reading said GPS parameter data stored in said memory after power is re-applied to said GPS receiver; and using said GPS parameter data to predict characteristics of said GPS signals for the purpose of faster acquisition of said GPS signals.

12. The method of claim 6 further including the steps of:

determining a time rate difference between said precise time reference signal and said first time reference signal;

determining a temperature of said GPS receiver when determining said time rate difference;

using said time rate difference to determine a real time clock calibration constant;

filtering said time rate difference; and storing said filtered time rate difference as a function of GPS receiver temperature in memory.

13. The method of claim 12 further including the steps of;

reading said filtered time rate difference;

receiving a temperature of said GPS receiver; and using said filtered time rate difference and said received temperature to improve said time rate difference of said first time reference signal.

* * * * *